US012091104B2

(12) United States Patent
Yoo et al.

(10) Patent No.: US 12,091,104 B2
(45) Date of Patent: Sep. 17, 2024

(54) AUTOMOBILE STEERING APPARATUS

(71) Applicant: HL MANDO CORPORATION, Pyeongtaek-si (KR)

(72) Inventors: Byung Wook Yoo, Seoul (KR); Jung Sik Park, Seongnam-si (KR); Kyung Min Ko, Seongnam-si (KR); Sang Hee Ahn, Hwaseong-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 533 days.

(21) Appl. No.: 17/605,620

(22) PCT Filed: May 8, 2020

(86) PCT No.: PCT/KR2020/006126
§ 371 (c)(1),
(2) Date: Oct. 22, 2021

(87) PCT Pub. No.: WO2020/231114
PCT Pub. Date: Nov. 19, 2020

(65) Prior Publication Data
US 2022/0258791 A1    Aug. 18, 2022

(30) Foreign Application Priority Data

May 14, 2019  (KR) .................. 10-2019-0055998

(51) Int. Cl.
*B62D 5/04* (2006.01)
*F16H 57/02* (2012.01)
*F16H 57/031* (2012.01)

(52) U.S. Cl.
CPC ......... *B62D 5/0448* (2013.01); *B62D 5/0454* (2013.01); *F16H 57/031* (2013.01);
(Continued)

(58) Field of Classification Search
CPC ................... B62D 5/0454; B62D 5/0448
See application file for complete search history.

(56) References Cited

U.S. PATENT DOCUMENTS 6,527,642 B1    3/2003  Arai et al.
6,832,662 B2 *  12/2004 Shimizu ............... F16C 19/507
                                                            74/427
(Continued)

FOREIGN PATENT DOCUMENTS

CN    100999225 A    7/2007
CN    103352960 A   10/2013
(Continued)

OTHER PUBLICATIONS

International Search Report issued on Aug. 13, 2020, corresponding to International Application No. PCT/KR2020/006126.
(Continued)

*Primary Examiner* — Tony H Winner
*Assistant Examiner* — Hosam Shabara
(74) *Attorney, Agent, or Firm* — Hauptman Ham, LLP (57) ABSTRACT

The present discrete relate to an automobile steering apparatus and, more specifically, to an automobile steering apparatus that is capable of preventing or reducing the consumption of engine power and reducing the number of components, and further capable of enhancing convenience for drivers by using functions for controlling the automobile, such as automatic parking, lane keeping, driving assistance according to road conditions, steering vibration attenuation, autonomous driving control, and the like, and in turn, is advantageous to the strength of worm wheels by causing pressure applied thereto to be distributed and provides drivers with enhanced steering feel.

9 Claims, 8 Drawing Sheets

(52) U.S. Cl.
CPC .............. *F16H 2057/02034* (2013.01); *F16H 2057/02082* (2013.01)

(56) References Cited

U.S. PATENT DOCUMENTS

| | | | |
|---|---|---|---|
| 8,360,197 | B2 | 1/2013 | Escobedo et al. |
| 9,010,483 | B2 * | 4/2015 | Kimoto ................ B62D 5/0409 180/444 |
| 10,508,723 | B2 * | 12/2019 | Kim ...................... B62D 5/0409 |
| 11,760,408 | B2 * | 9/2023 | Zimmermann ......... F16C 23/06 180/444 |
| 11,981,381 | B2 * | 5/2024 | Wuebbolt-Gorbatenko ................ B62D 7/1545 |
| 2011/0147113 | A1 | 6/2011 | Ko et al. |
| 2012/0241244 | A1 | 9/2012 | Escobedo et al. |
| 2013/0133974 | A1 | 5/2013 | Hamakita et al. |
| 2014/0311263 | A1 | 10/2014 | Washnock et al. |

FOREIGN PATENT DOCUMENTS

| | | |
|---|---|---|
| CN | 105984488 A | 10/2016 |
| CN | 107867317 A | 4/2018 |
| CN | 107914761 A | 4/2018 |
| EP | 2433849 A1 | 3/2012 |
| JP | 2003-159635 A | 6/2003 |
| JP | 2005-306317 A | 11/2005 |
| JP | 2007-145273 A | 6/2007 |
| JP | 2008-56222 A | 3/2008 |
| JP | 2008-126873 A | 6/2008 |
| KR | 10-2018-0124466 A | 11/2018 |

OTHER PUBLICATIONS

Chinese Notice of Allowance issued on Nov. 15, 2023, in connection with the Chinese Patent Application No. 202080033514.0, 6 pages.

* cited by examiner

AUTOMOBILE STEERING APPARATUS

CROSS-REFERENCE TO RELATED APPLICATION

The present application is a national stage filing under 35 U.S.C § 371 of PCT application number PCT/KR2020/006126 filed on May 8, 2020 which is based upon and claims the benefit of priorities to Korean Patent Application No. 10-2019-0055998 filed on May 14, 2019, in the Korean Intellectual Property Office. Both of the aforementioned applications are hereby incorporated by reference in their entireties.

TECHNICAL FIELD

The present disclosure relates to automobile steering apparatuses and, more specifically, to an automobile steering apparatus that is capable of reducing or preventing the consumption of engine power and reducing the number of components employed therein, and further capable of enhancing convenience for drivers by using functions of controlling the automobile, such as autonomous parking, lane keeping, driving assistance depending on road conditions, steering vibration attenuation, autonomous driving control, and the like, and in turn, is advantageous to the strength of worm wheels by causing pressure applied thereto to be distributed and provides drivers with enhanced steering feel.

BACKGROUND ART

In general, a steering apparatus of a vehicle is an apparatus for enabling a driver to change a direction in which the vehicle travels by turning a steering wheel. The steering apparatus is an assist apparatus for helping the driver to steer the vehicle in a direction in which the driver desires to travel by allowing the center of rotation around which the front wheels of the vehicle rotate to be changed by a desired angle.

In addition, a power assist steering apparatus is an apparatus for helping a driver to turn the steering wheel of a vehicle by using an apparatus providing steering assist force when the driver operates the steering wheel, leading the driver to easily change a traveling direction of the vehicle with less effort.

In enabling a tie rod or knuckle to operate through a link coupled to a pitman arm, and thereby, wheels to steer, by rotating a sector shaft coupled to the pitman arm, a conventional hydraulic power assist steering apparatus helps a driver to operate the steering wheel by enabling the sector shaft to rotate easier by hydraulic pressure.

However, such a hydraulic power assist steering apparatus has disadvantages of consuming engine power while it operates because a hydraulic pump for supplying the hydraulic pressure is connected to the engine of the vehicle, requiring several hydraulic-related components such as the hydraulic pump, a hydraulic line, a reservoir, and the like, and causing contamination as hydraulic oil consumes.

In particular, since no electronic controller is used in the hydraulic power assist steering apparatus, additional disadvantages thereof are that some functions provided by using such a controller cannot be used, for example, autonomous parking, lane keeping, driving assistance depending on road conditions, steering vibration attenuation, autonomous driving control, and the like.

DETAILED DESCRIPTION OF THE INVENTION

Technical Problem

To address these issues, embodiments of the present disclosure provide a steering apparatus for a vehicle capable of reducing or preventing the consumption of engine power and reducing the number of components employed therein. Further, the steering apparatus is capable of enhancing convenience for drivers by using functions of controlling the vehicle, such as autonomous parking, lane keeping, driving assistance depending on road conditions, steering vibration attenuation, autonomous driving control, and the like, and is advantageous to the strength of worm wheels by causing pressure applied thereto to be distributed. In turn, the steering apparatus provides drivers with enhanced steering feel.

Objects of the present disclosure are not limited thereto, and other objects may be clearly understood by those skilled in the art from description below.

Technical Solution

According to aspects of the present disclosure, a steering apparatus is provided that includes a housing in which a ball screw, a ball nut coupled to the ball screw via balls, and a sector shaft engaged with the ball nut are contained, an output shaft connected with the ball screw, a reducer including a worm wheel coupled to the output shaft, and first and second worm shafts engaged with the worm wheel, and a motor coupled to the first and second worm shafts via a gearbox. The gearbox includes a first shaft connected with a motor shaft of the motor, a first gear coupled to the first shaft, a second shaft connected with one of the first and second worm shafts, a second gear coupled to the second shaft and engaged with the first gear, a third shaft connected with the other of the first and second worm shafts, a third gear coupled to the third shaft, a fourth shaft, and a fourth gear coupled to the fourth shaft and engaged with the first and third gears. The gearbox includes an actuator for disengaging the fourth gear from at least one of the first and third gears by sliding the fourth shaft in an axial direction.

Effects of the Invention

According to embodiments of the present disclosure, a steering apparatus for a vehicle can be provided that is capable of reducing or preventing the consumption of engine power and reducing the number of components employed therein, and further capable of enhancing convenience for drivers by using functions of controlling the vehicle, such as autonomous parking, lane keeping, driving assistance depending on road conditions, steering vibration attenuation, autonomous driving control, and the like, and in turn, is advantageous to the strength of worm wheels by causing pressure applied thereto to be distributed and provides drivers with enhanced steering feel.

BEST MODE FOR CARRYING OUT THE INVENTION

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 1:
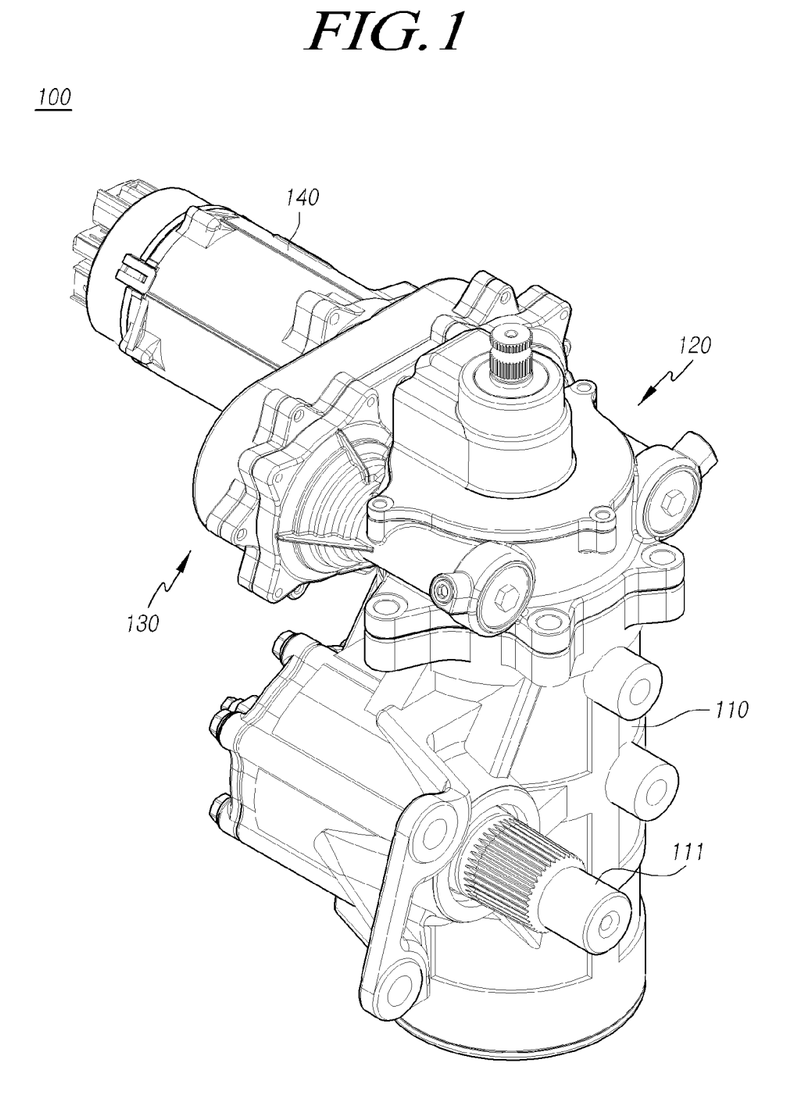
FIG. 1 is a perspective view of a steering apparatus for a vehicle according to aspects of the present disclosure.
Figure 2:
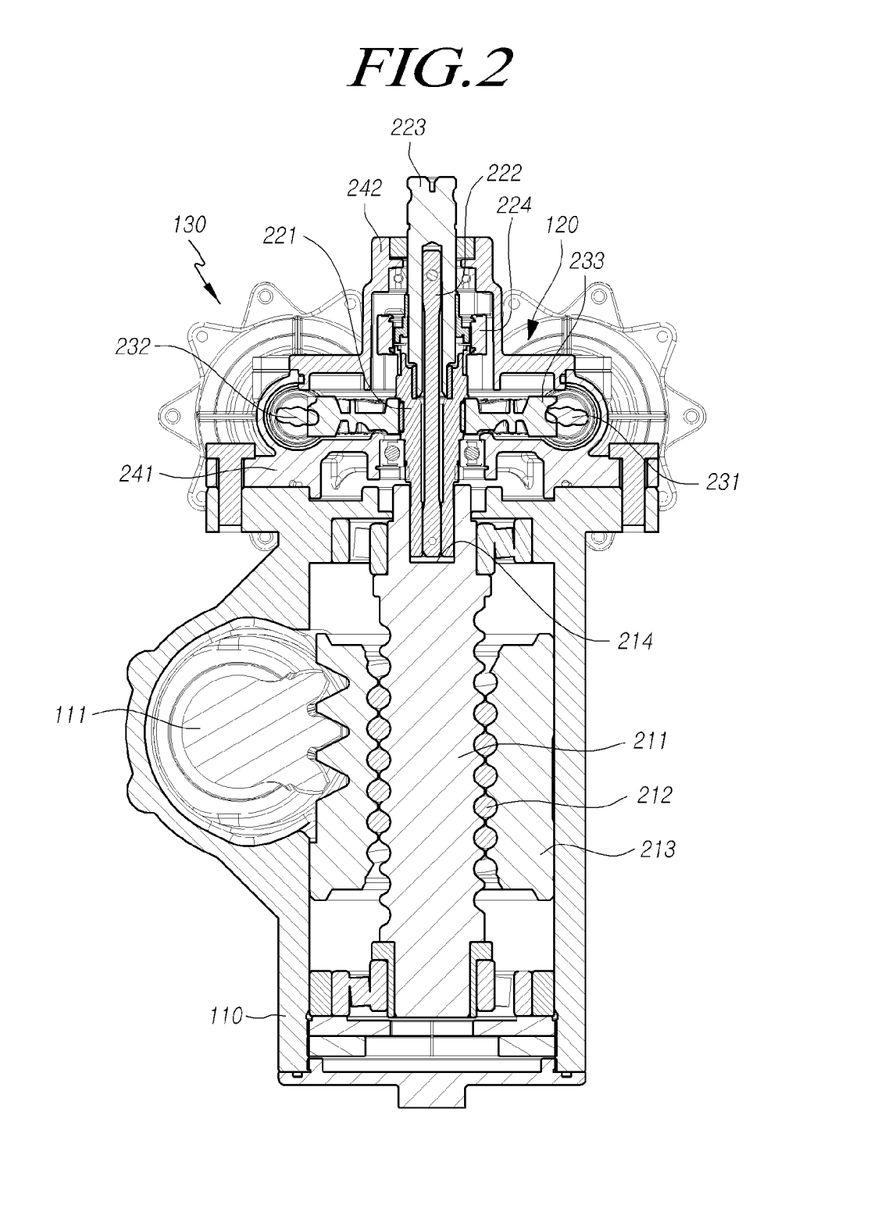
FIG. 2 is a cross-sectional view of the steering apparatus illustrated in FIG. 1.
Figure 3:
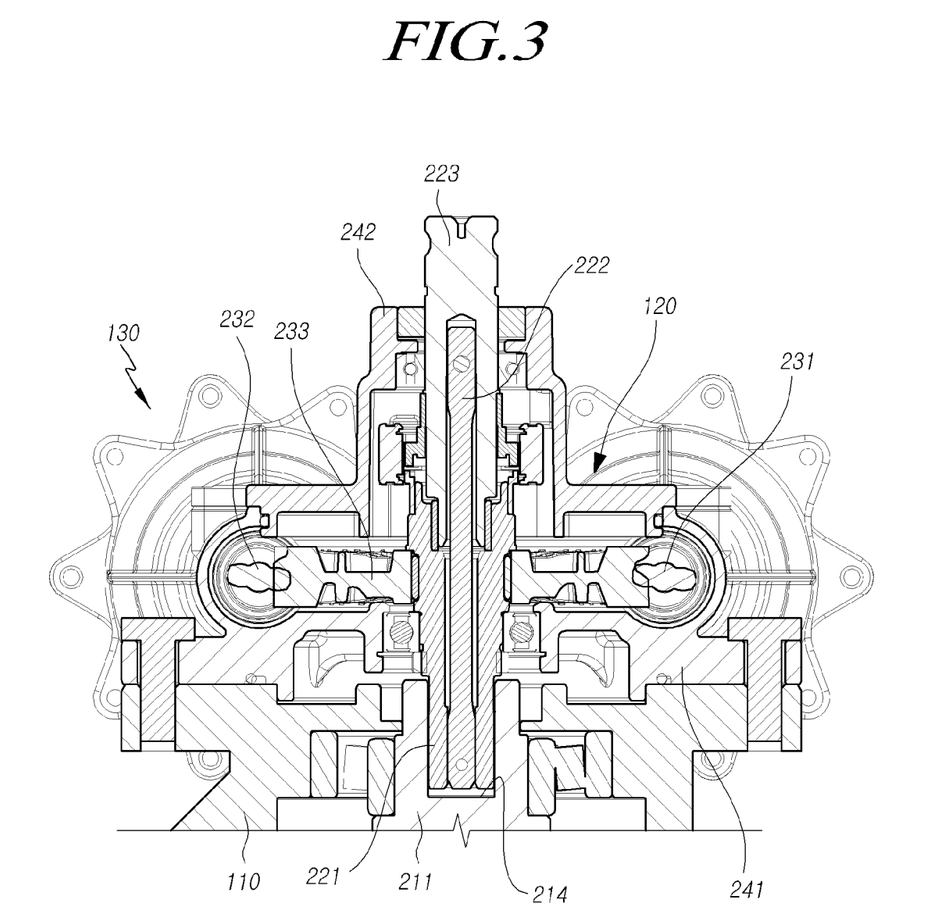
FIG. 3 is an enlarged view of a portion of FIG. 2.
Figure 4:
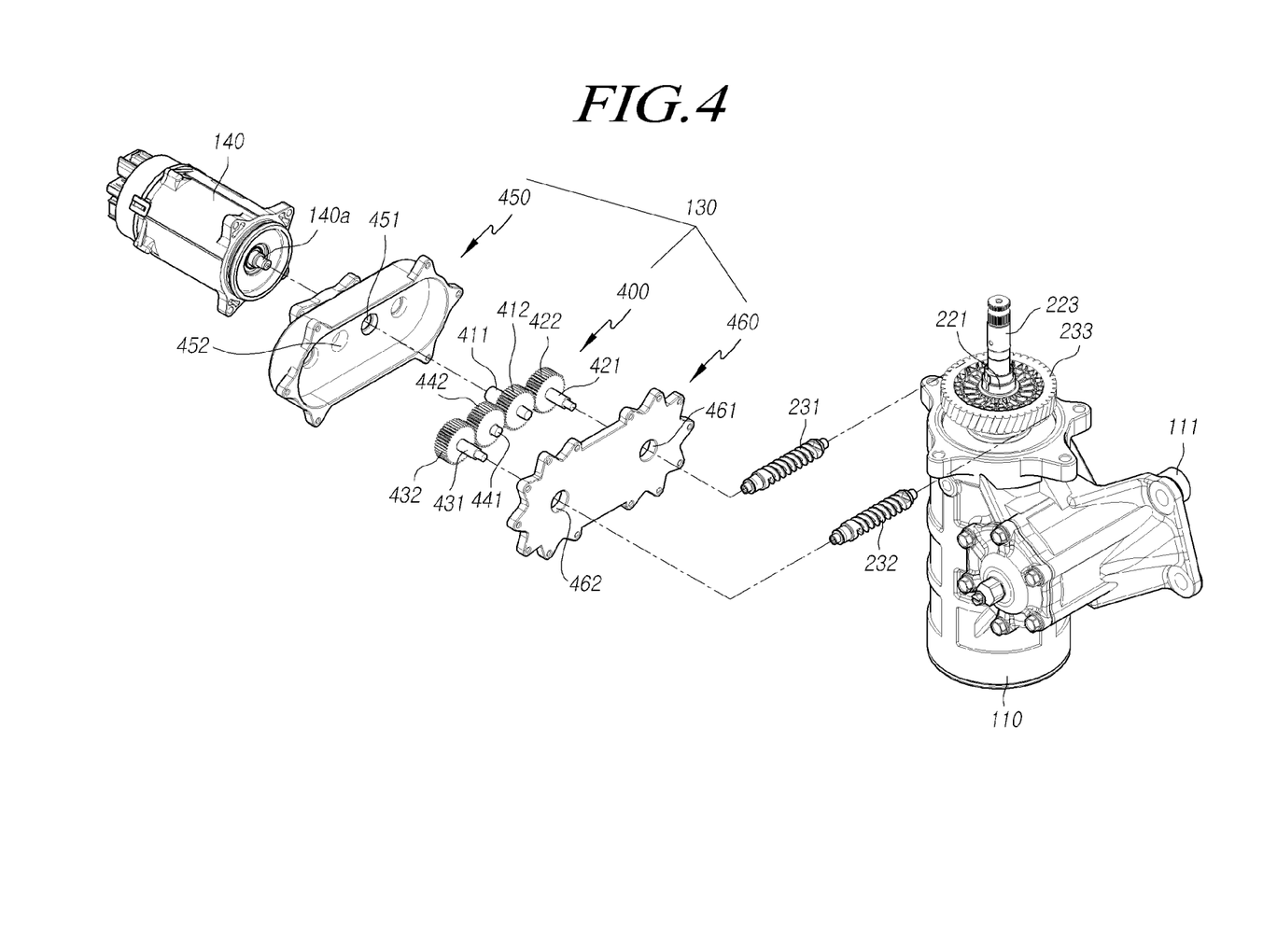
FIGS. 4 and 5 are exploded perspective views for a portion of FIG. 1.
Figure 5:
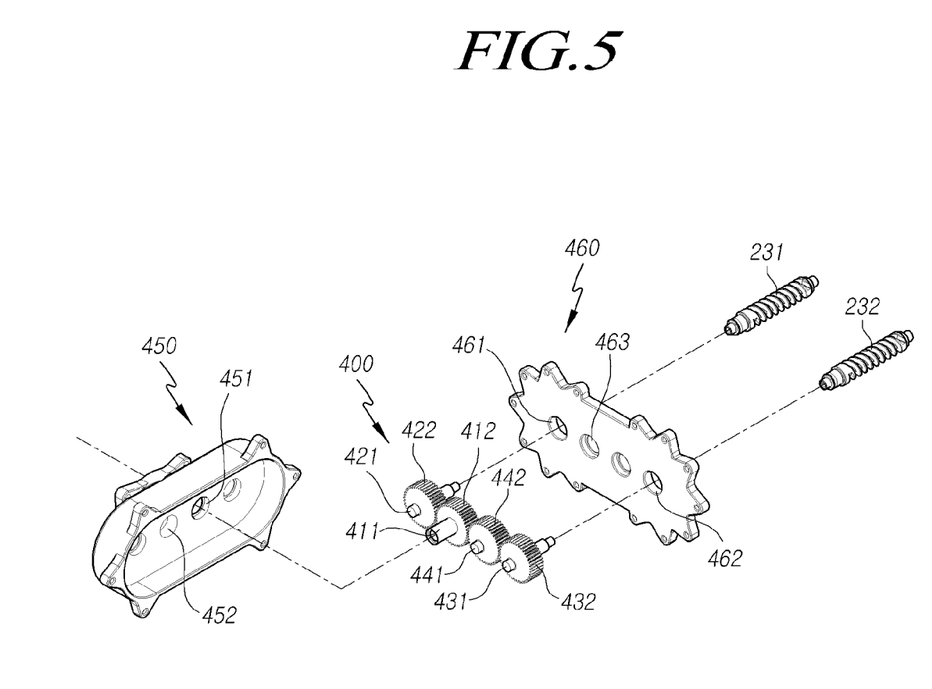
Figure 6:
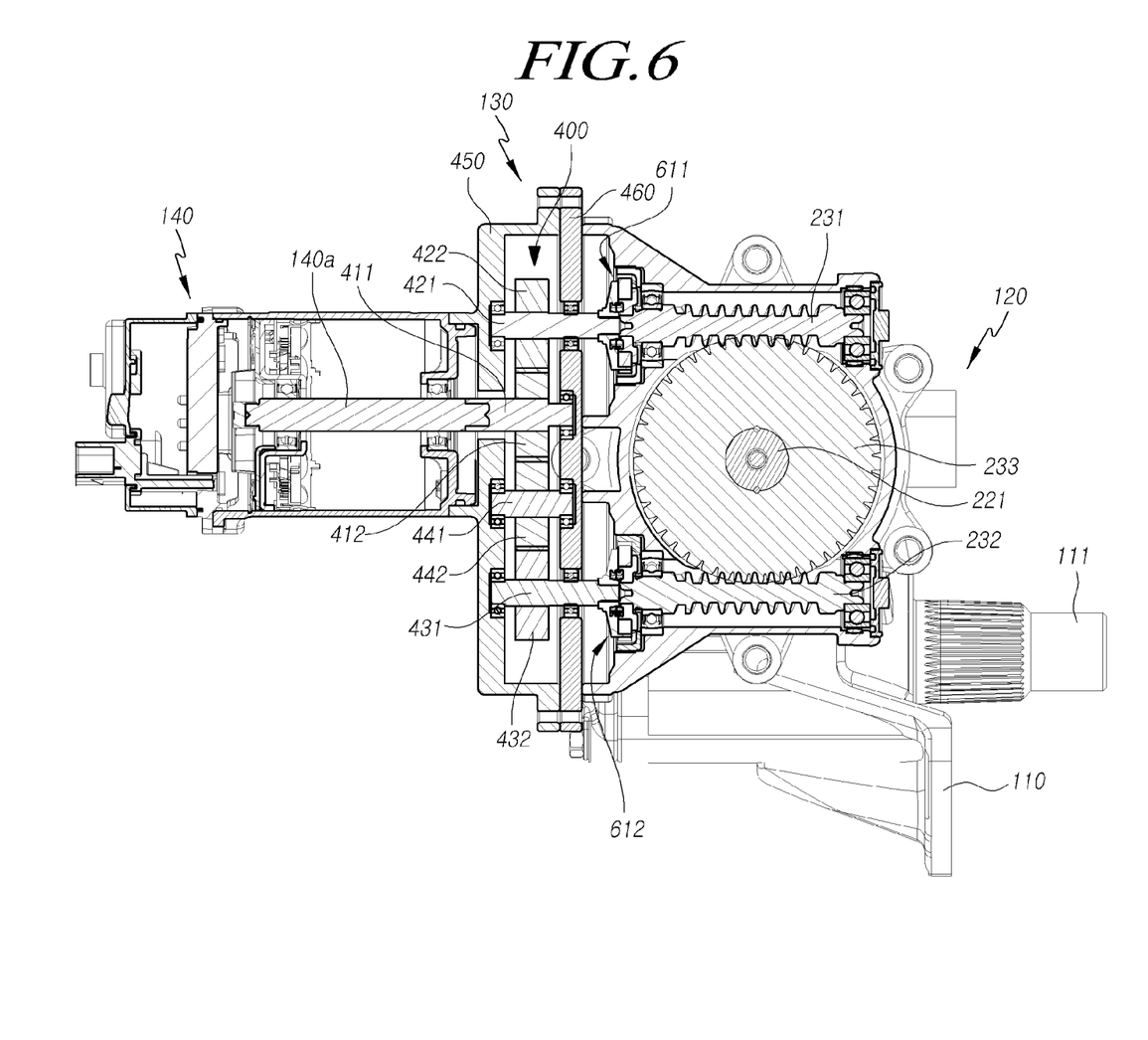
FIG. 6 is a cross-sectional view of the steering apparatus of FIG. 1.
Figure 7:
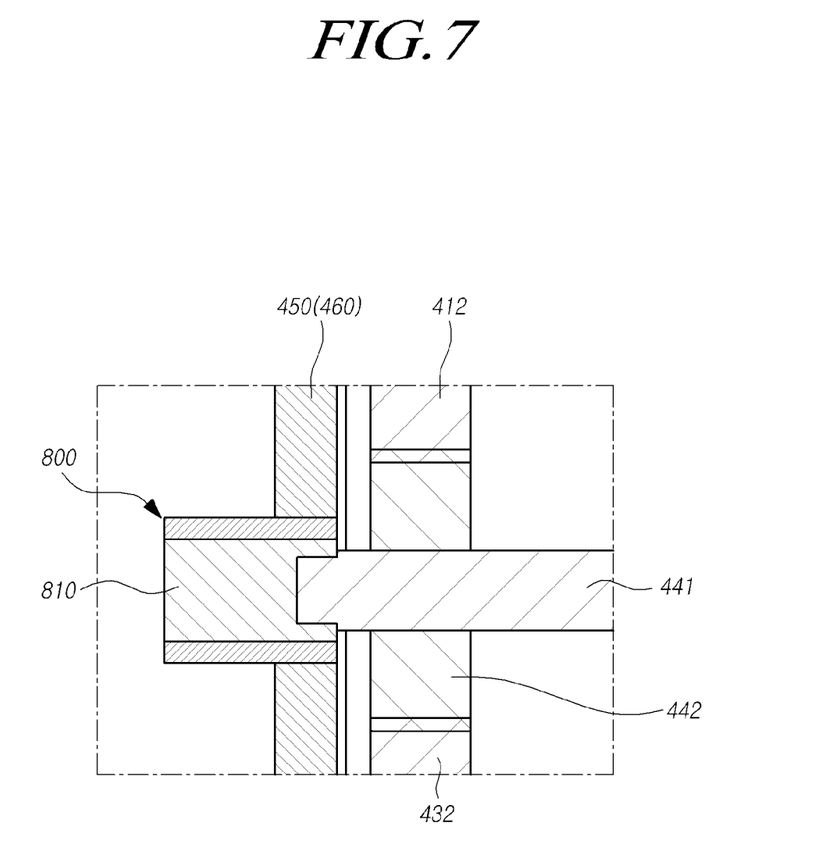
FIG. 7 is a cross-sectional view of a portion of the steering apparatus of the vehicle according to aspects of the present disclosure.
Figure 8:
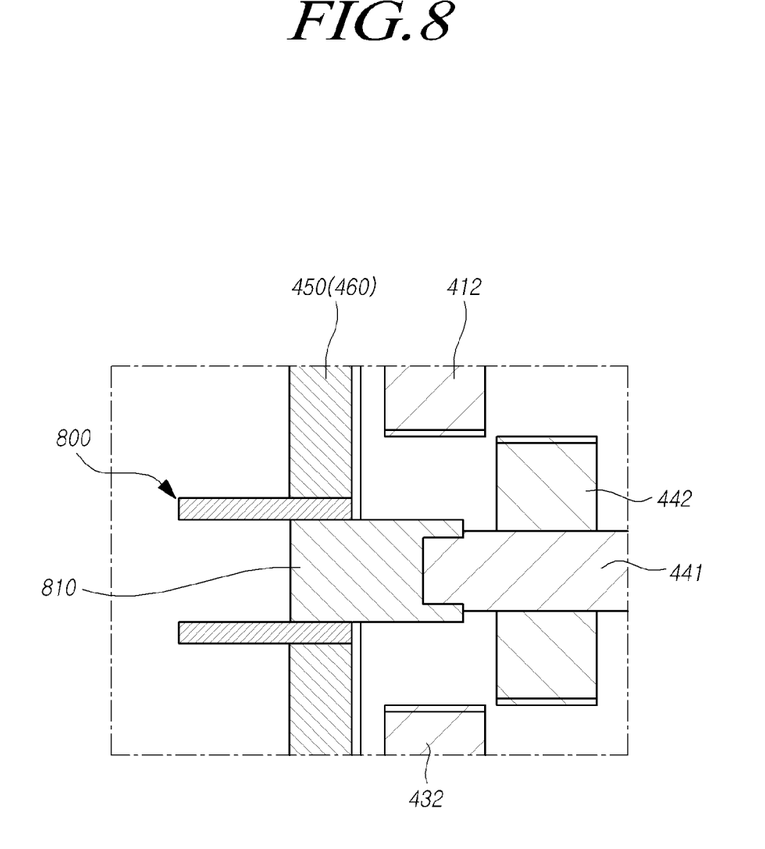
FIG. 8 illustrates an operating status of FIG. 7.

FIG. 1 is a perspective view of a steering apparatus for a vehicle according to aspects of the present disclosure; FIG. 2 is a cross-sectional view of FIG. 1; FIG. 3 is an enlarged view of a portion of FIG. 2; FIGS. 4 and 5 are exploded perspective views for a portion of FIG. 1; FIG. 6 is a cross-sectional view of FIG. 1; FIG. 7 is a cross-sectional view of a portion of the steering apparatus of the vehicle according to aspects of the present disclosure; and FIG. 8 illustrates an operating status of FIG. 7.

A steering apparatus 100 according to aspects of the present disclosure includes a housing 110 in which a ball screw 211, a ball nut 213 coupled to the ball screw 211 via balls 212, and a sector shaft 111 engaged with the ball nut 213 are contained, an output shaft 221 connected with the ball screw 211, a reducer 120 including a worm wheel 233 coupled to the output shaft 221, and first and second worm shafts 231 and 232 engaged with the worm wheel 233, and a motor 140 coupled to the first and second worm shafts 231 and 232 via a gearbox 130. The gearbox 130 includes a first shaft 411 connected with a motor shaft 141a of the motor 140, a first gear 412 coupled to the first shaft 411, a second shaft 421 connected with one of the first and second worm shafts 231 and 232, a second gear 422 coupled to the second shaft 421 and engaged with the first gear 412, a third shaft 431 connected with the other of the first and second worm shafts 231 and 232, a third gear 432 coupled to the third shaft 431, a fourth shaft 441, and a fourth gear 442 coupled to the fourth shaft 441 and engaged with the first and third gears 412 and 432. The gearbox 130 includes an actuator 800 for disengaging the fourth gear 442 from at least one of the first and third gears 412 and 432 by sliding the fourth shaft 441 in an axial direction.

Hereinafter, the steering apparatus 100 according to embodiments of the present disclosure is described with reference to FIGS. 1 to 3.

The ball screw 211 may be connected to a steering shaft (not shown) through the output shaft 221, an input shaft 223, and the like, and can rotate as a driver turns an associated steering wheel.

An outer circumferential screw groove may be formed on an outer circumferential surface of the ball screw 211, and an inner circumferential screw groove may be formed on an inner circumferential surface of the ball nut 213. Thereby, the ball screw 211 and the ball nut 213 can be coupled via balls 212.

As the ball screw 211 rotates, the ball nut 213 can slide in the axial direction of the ball screw 211 in the housing 110.

In a situation where gears meshing with each other are formed in the ball nut 213 and the sector shaft 111, as the ball nut 213 slides, the sector shaft 111 can rotate, and thereby, a pitman arm (not shown) coupled to the sector shaft 111 can operate. In turn, wheels can be steered by a link.

In a situation where the output shaft 221 is coupled to the ball screw 211, as the reducer 120 coupled to the output shaft 221 is driven by the motor 140, the torque of the motor 140 can be transferred to the ball screw 211, and therefore, steering wheel operation of the driver can be assisted.

The ball screw 211 may have a depression 214 that is depressed in the axial direction, and the output shaft 221 may be inserted in the depression 214 to be coupled to the ball screw 211.

In another embodiment, the output shaft 221 and the ball screw 211 may be coupled by press fitting. For example, serrations may be formed in an end of the output shaft 221 and the depression 214 to be supported in the circumferential direction.

The output shaft 221 may be coupled to the input shaft 223 coupled to the steering shaft via a torsion bar 222, and using a torque sensor 224 provided, driver's steering torque can be obtained based on a phase difference between the input shaft 223 and the output shaft 221.

Although not shown in drawings, using a controller provided, as information detected by sensors including the torque sensor 224, and the like can be collected, and the motor 140 can be controlled based on the collected information, it is therefore possible to enhance convenience for drivers by using functions of controlling the vehicle, such as autonomous parking, lane keeping, driving assistance depending on road conditions, steering vibration attenuation, autonomous driving control, and the like.

As described above, the reducer 120 driven by the motor 140 may be coupled to the output shaft 221, and the reducer 120 may include the worm wheel 233 coupled to the output shaft 221, and the first worm shaft 231 and the second worm shaft 232 engaged with the worm wheel 233.

The reducer 120 may include a reducer cover 241 for accommodating the worm wheel 233, the first worm shaft 231, the second worm shaft 232, and the like, and a torque sensor cover 242 that is coupled to the reducer cover 241 and is for accommodating the torque sensor 224, and the like.

As shown in drawings, the output shaft 221 and the input shaft 223 may be respectively coupled to the reducer cover 241 and the torque sensor cover 242 via bearings.

As the first worm shaft 231 and the second worm shaft 232 mesh with the worm wheel 233, the pressure applied to the gear teeth of the worm wheel 233 meshing with the worm gear can be distributed, thus, this structure can have reduced wear and advantageous strength. In turn, some play due to wear between the worm wheel 233 and the first worm shaft 231 or the second worm shaft 232 can be reduced, and thereby, noise can be reduced.

The first worm shaft 231 and the second worm shaft 232 may be disposed on respective sides opposite to each other with respect to the worm wheel 233. Accordingly, respective supporting forces applied to the worm wheel 233 by the rotation of the first worm shaft 231 and the second worm shaft 232 can be offset, and thereby, the vibration of the worm wheel 233 can be reduced or prevented, and friction can be reduced.

That is, as shown in drawings, the first worm shaft 231 and the second worm shaft 232 may be located in parallel with the worm wheel 233 interposed therebetween to be coupled to the gearbox 130.

Hereinafter, the steering apparatus 100 according to embodiments of the present disclosure is described with reference to FIGS. 4 to 6.

The gearbox 130 may include a gear set 400 connecting the motor 140 and the first and second worm shafts 231 and 232, and first and second covers 450 and 460 for accommodating the gear set 400. The gear set 400 may include a first gear 412, and the like, as described below.

That is, since the first worm shaft 231 and the second worm shaft 232 are located on respective sides opposite to each other with respect to the worm wheel 233, in order for the worm wheel 233 to rotate, the first worm shaft 231 and the second worm shaft 232 are needed to rotate in respective directions opposite to each other. To do this, the first worm shaft 231 and the second worm shaft 232 driven by one motor 140 can be rotated in opposite directions to each other by such a structure of the gear set 400.

First, the gearbox 130 may include the first shaft 411 connected with the motor shaft 140a of the motor 140, and the first gear 412 coupled to the first shaft 411.

The first shaft 411 and the motor shaft 140a may be integrated together. In another embodiment, one of the first shaft 411 and the motor shaft 140a may have a protrusion protruding in the axial direction and having serrations, and the other one may have a depression allowing the projection to be inserted and having serrations, so that the serrations formed on the projection and the depression can be meshed with each other to be coupled.

In addition, the first shaft 411 and the first gear 412 may be integrated together. In another embodiment, the first gear 412 may have a coupling hole allowing the first shaft 411 to be inserted and having serrations, so that the serrations formed on the first gear 412 and the first shaft 411 can be meshed with each other to be coupled.

The first shaft 411 and the second to fourth shafts 421, 431, and 441 to be described below can be supported by the first cover 450 and the second cover 460 through bearings. To do this, the first cover 450 and the second cover 460 may have seating grooves 452 and 463 for allowing such bearings to be inserted.

Next, the gearbox 130 may include the second shaft 421 connected with one of the first worm shaft 231 and the second worm shaft 232, and the second gear 422 coupled to the second shaft 421 and engaged with the first gear 412.

Similar to the configuration of the first shaft 411 and the first gear 412, the second shaft 421 and the second gear 422 may be integrated together, or coupled to each other through serrations formed thereon. That is, the configuration of the first shaft 411 and the first gear 412 may be substantially equally applied to the third shaft 431, the fourth shaft 441, and the like, as well as the second shaft 421, hereinafter, corresponding description will be omitted below for convenience of description.

The second shaft 421 may be connected with any one of the first worm shaft 231 and the second worm shaft 232. For convenience of description, as shown in drawings, discussions will be given on an example in which the second shaft 421 is connected with the first worm shaft 231.

The second shaft 421 and the first worm shaft 231 may be coupled via a damping coupler 611 including a damper, and the like, to absorb vibration and noise.

In a situation where the first gear 412 and the second gear 422 mesh with each other, as the first worm shaft 231 is rotated by the motor 140, the motor shaft 140a and the first worm shaft 231 can rotate in opposite directions to each other.

Accordingly, the second worm shaft 232 rotating in a direction opposite to the first worm shaft 231 can rotate in the same direction as the motor shaft 140a.

Although not shown in drawings, the second worm shaft 232 and the motor shaft 140a may be coaxially connected, and when such a coaxial structure is provided, the first gear 412 and the second gear 412 are needed to have relatively large diameters when considering the diameter of the worm wheel 233. In this case, it may be advantageous in terms of cost, manufacturing convenience, package, etc. that the third shaft 431, the fourth shaft 441, and the like are further included, and corresponding gears are formed with a relatively small diameter.

That is, the gearbox 130 may include the third shaft 431 connected with the other of the first worm shaft 231 and the second worm shaft 232, the third gear 432 coupled to the third shaft 431, the fourth shaft 441, and the fourth gear 442 coupled to the fourth shaft 441 and meshed with the first gear 412 and the third gear 432.

As shown in drawings, the third shaft 431 is connected with the second worm shaft 232 via a damping coupler 612, and the fourth gear 442 is located between the first gear 412 and the third gear 432, so that the second worm shaft 232 can be rotated by the motor 140.

As the first gear 412 and the third gear 432 are not directly meshed with each other, and the fourth gear 442 is provided therebetween, the second worm shaft 232 can rotate in the same direction as the motor shaft 140a and in the opposite direction to the first worm shaft 231.

In addition, the second gear 422 and the third gear 432 may be formed to have the same diameter so that the first worm shaft 231 and the second worm shaft 232 can rotate at the same rotational speed.

That is, respective gear ratios of the second gear 422 and the third gear 432 to the first gear 412 may be the same.

In addition, as shown in drawings, it may be advantageous in terms of cost, manufacturing convenience, package, etc. that all of the first to fourth gears (412, 422, 432, and 442) are formed with the same diameter.

Meanwhile, as described above, the gearbox 130 may include the first cover 450 and the second cover 460. In this case, the first cover 450 may be coupled to the motor 140, and the second cover 460 may be coupled to the reducer 120.

The first cover 450 and the second cover 460 may have a plurality of coupling portions in which screw holes are formed, and can be screwed to the motor 140 and the reducer 120.

The gear set 400 may be accommodated between the first cover 450 and the second cover 460. As shown in drawings, as one side of the first cover 450 is opened, and the second cover 460 closes the opened portion of the first cover 450, the first cover 450 and the second cover 460 may be coupled to each other.

In order for the gear set 400 to be connected with the motor shaft 140a, the first worm shaft 231, and/or the second worm shaft 232, the first cover 450 and the second cover 460 may have first to third holes (451, 461, and 462).

That is, the first hole 451 may be formed through the first cover 450, and the first shaft 411 may be coupled to the motor shaft 140a through the first hole 451.

In addition, the second hole 461 and the third hole 462 are formed through the second cover 460, and the second shaft 421 may be coupled to one of the first worm shaft 231 and the second worm shaft 232 through the second hole 461, and the third shaft 431 may be coupled to the other one of the first worm shaft 231 and the second worm shaft 232 through the third hole 462.

Hereinafter, the steering apparatus 100 according to embodiments of the present disclosure is described with reference to FIGS. 7 to 8.

The gearbox 130 may include the actuator 800 for disengaging the fourth gear 442 from at least one of the first and third gears 412 and 432 by sliding the fourth shaft 441 in an axial direction.

As shown in drawings, the actuator 800 may be located in any one of the first cover 450 and the second cover 460 to be coupled to the fourth shaft 441.

Further, the actuator 800 may be a solenoid including a driving shaft 810 coupled to the fourth shaft 441. The driving shaft 810 of the solenoid may be configured to rotate together with the fourth shaft 441.

That is, as the drive shaft 810 protrudes by the operation of the solenoid, the fourth shaft 441 and the fourth gear 442 can slide in the axial direction, and the fourth gear 442 can be disengaged from at least one of the first gear 412 and the third gear 432.

Although not shown in drawings, the first cover 450 and the second cover 460 may be formed to have a wider space therein in order to ensure a movable range for enabling the fourth shaft 441 to slide in the axial direction. In this case, in a situation where the fourth shaft 441 slides, an end opposite to an end of the fourth shaft 441 coupled to the driving shaft 810 may protrude outward through the other one of the first cover 450 and the second cover 460.

Although FIG. 8 illustrates that the fourth gear 442 is disengaged from both the first gear 412 and the third gear 432; however, in another embodiment, the fourth gear 442 may be disengaged from one of the first gear 412 or the third gear 432.

The fourth gear 442 is meshed with the first gear 412 and the third gear 432, and thereby, connects the motor shaft 140a and the second worm shaft 232. In this case, as the actuator 800 is employed, and the fourth gear 442 is disengaged from at least one of the first gear 412 and the third gear 432, the torque of the motor 140 can be transferred to the worm wheel 233 only through the first worm shaft 231, but cannot be transferred to the worm wheel 233 through the second worm shaft 232.

In other words, when the actuator 800 is activated, the torque of the motor 140 can be transferred to the worm wheel 233 only through the first worm shaft 231, and when the actuator 800 is deactivated, the torque of the motor 140 can be transferred to the worm wheel 233 through the first worm shaft 231 and the second worm shaft 232.

Since noise generated from the reducer 120 is relatively low in a situation where only the first worm shaft 231 is driven, the actuator 800 can be activated in a situation where a driver can easily recognize even low noise (for example, during low-speed driving). Further, since noise generated from the reducer 120 is relatively high in a situation where both the first worm shaft 231 and the second worm shaft 232 are driven, the actuator 800 can be deactivated in a situation where a driver cannot easily recognize noise (for example, during high-speed driving).

That is, the actuator 800 may be activated or deactivated depending on situations to increase the driver's steering feel.

As described above, it should be noted that the fact that pressure applied to the gear teeth of the worm wheel 233 can be distributed and thereby, noise can be reduced by enabling the first worm shaft 231 and the second worm shaft 232 to engage with the worm wheel 233 means that noise by wear and play caused while the reducer 120 is driven for a long time can be reduced, and therefore, is different from the fact that noise generated when both the first worm shaft 231 and the second worm shaft 232 are driven can be relatively higher than noise generated when only the first worm shaft 231 is driven.

A controller that has received information from a vehicle speed sensor and the like can control the activation of the actuator 800 based on the collected information.

The vehicle steering apparatus having the structure or configuration according the embodiments described herein can reduce or prevent the consumption of engine power and reduce the number of components employed therein, and further enhance convenience for drivers by using functions of controlling the vehicle, such as autonomous parking, lane keeping, driving assistance depending on road conditions, steering vibration attenuation, autonomous driving control, and the like, and in turn, be advantageous to the strength of worm wheels by causing pressure applied thereto to be distributed and provide drivers with enhanced steering feel.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

As described above, the entire contents of Korean Patent Application No. 10-2019-0055998, filed on May 14, 2019 are incorporated herein by reference. In addition, this non-provisional application claims priorities in countries other than the U.S. for the same reason based on the Korean Patent Applications, the entire contents of which are hereby incorporated by reference.

What is claimed is:

1. An automobile steering apparatus comprising:
   a housing including a ball screw, a ball nut coupled to the ball screw via balls, and a sector shaft engaged with the ball nut;
   an output shaft connected with the ball screw;
   a reducer including a worm wheel coupled to the output shaft, and first and second worm shafts engaged with the worm wheel; and
   a motor coupled to the first and second worm shafts via a gearbox,
   wherein the gearbox comprises:
   a first shaft connected with a motor shaft of the motor;
   a first gear coupled to the first shaft;
   a second shaft connected with one of the first and second worm shafts;
   a second gear coupled to the second shaft and engaged with the first gear;
   a third shaft connected with the other of the first and second worm shafts;
   a third gear coupled to the third shaft;
   a fourth shaft; and
   a fourth gear coupled to the fourth shaft and engaged with the first and third gears, and
   wherein the gearbox further includes an actuator for disengaging the fourth gear from at least one of the first and third gears by sliding the fourth shaft in an axial direction.

2. The automobile steering apparatus according to claim 1, wherein the ball screw has a depression that is depressed in the axial direction, and the output shaft is inserted in the depression.

3. The automobile steering apparatus according to claim 1, wherein the output shaft is coupled to an input shaft connected with a steering shaft via a torsion bar.

4. The automobile steering apparatus according to claim 1, wherein the first worm shaft and the second worm shaft are disposed on respective sides opposite to each other with respect to the worm wheel.

5. The automobile steering apparatus according to claim 1, wherein the second gear and the third gear have a substantial equal diameter.

6. The automobile steering apparatus according to claim 1, wherein the gearbox includes a first cover coupled to the motor, and a second cover coupled to the reducer.

7. The automobile steering apparatus according to claim 6, wherein a first hole is formed through the first cover, and the first shaft is coupled to the motor shaft through the first hole.

8. The automobile steering apparatus according to claim 6, wherein a second hole and a third hole are formed through the second cover, and the second shaft is coupled to one of the first worm shaft and the second worm shaft through the second hole, and the third shaft is coupled to the other of the first worm shaft and the second worm shaft through the third hole.

9. The automobile steering apparatus according to claim 1, wherein the actuator is a solenoid including a driving shaft coupled to the fourth shaft.

* * * * *